Patented Sept. 17, 1935

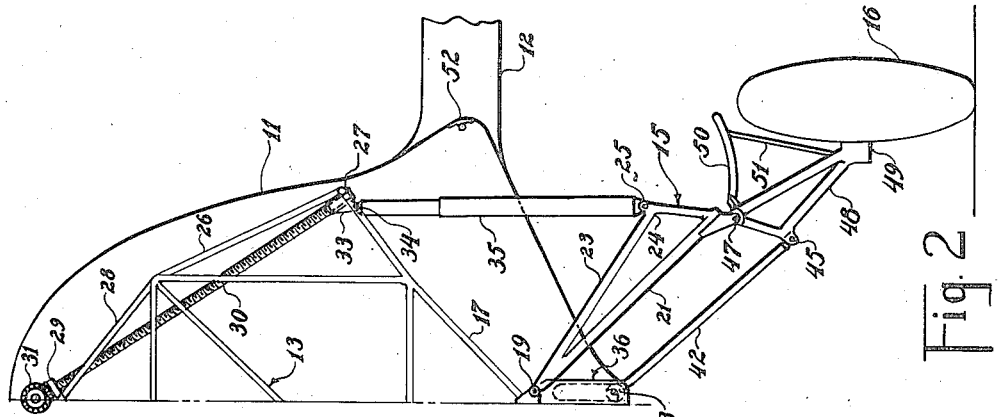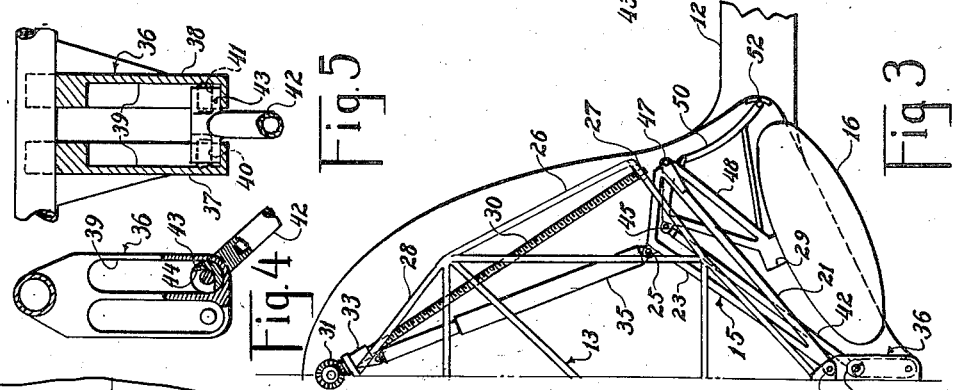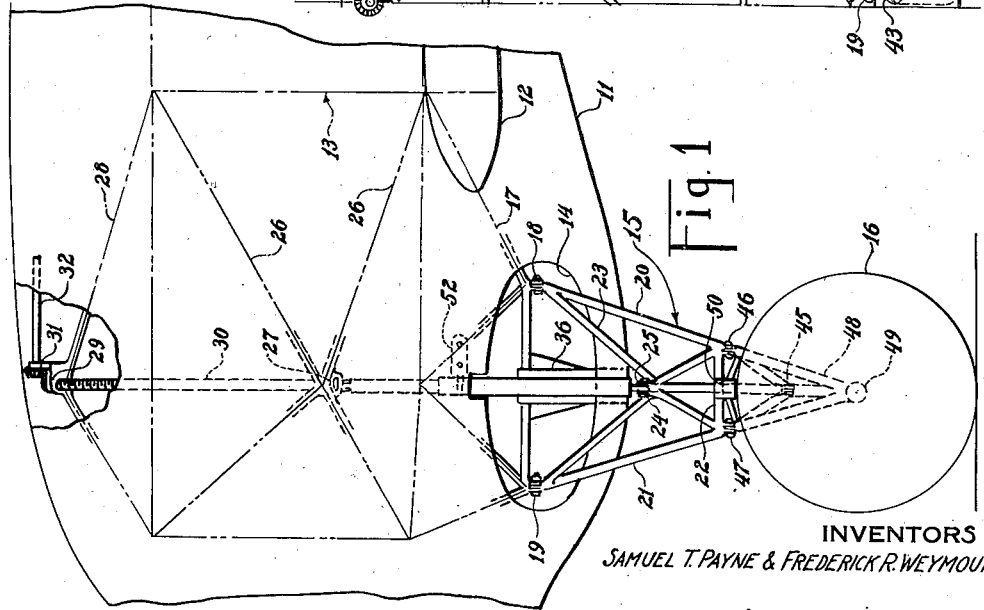

2,014,777

UNITED STATES PATENT OFFICE 2,014,777

RETRACTABLE LANDING GEAR

Samuel T. Payne, Kenmore, and Frederick R. Weymouth, Buffalo, N. Y., assignors to Curtiss Aeroplane & Motor Company, Inc., a corporation of New York Application January 6, 1933, Serial No. 650,466

11 Claims. (Cl. 244—2)

This invention relates to aircraft, and more particularly to retractable landing gears therefor.

The principal object of this device is to provide a landing gear which may be retracted to a position within the fuselage, especially on a plane which is equipped with thin wings.

An additional object is to provide a gear which may be retracted within a fuselage of nearly normal contour and size.

A further object is to provide a gear which may be retracted through an opening of minimum size.

Another object of the invention is to provide a wheel type landing gear, the wheels and structural members of which may be completely retracted within a recess formed in the aircraft.

A further object is to provide such a landing gear which may be withdrawn into a recess in the lower part of the body of an aircraft.

A further object is to provide a retractable landing gear which may be retracted and extended wholly in a transverse plane.

A still further object is to provide means whereby the wheels may be turned or canted inwardly when in the retracted position, and whereby they may be upright in their ground engaging position.

A still further object is to provide adequate shock absorbing mechanism and retracting mechanism, the latter being readily operated by the aircraft crew.

Further objects will be apparent from a reading of the subjoined specification and claims, and from a consideration of the accompanying drawing.

Generally, the landing gear of this invention comprises two separate and distinct, but similar units, one for each side of the aircraft. A description of one such unit is believed sufficient to cover both units, as they are identical. The aircraft is provided with a pair of spaced pivots, one above the other and adjacent the plane of symmetry of the aircraft. A pair of struts extend outwardly from these pivots and each strut of the pair is adapted to swing about said pivot. At the outer end of the struts, a small frame, on which is mounted the wheel axle, is pivoted. A shock absorbing strut is attached at its lower end to the upper previously mentioned strut, and at its upper end the shock absorbing strut is pivoted to a nut which is adapted to be translated along a screw mounted within the aircraft. The screw is adapted to be turned by suitable mechanism operable by the aircraft crew. The lower fuselage pivot adjacent the plane of symmetry is of peculiar construction, allowing for translation of said pivot along a vertical guide. Also, the wheel axle and its frame are provided with a cam adapted to engage a cam engaging device fixed to the fuselage of the aircraft when the landing gear is partly withdrawn. Upon engagement of the cam with said device, the wheel and axle are turned inwardly so that they set within a recess formed in the bottom of the fuselage.

For a more detailed description of the landing gear, reference may be made to the drawing, in which similar figures designate similar parts, and in which:

Fig. 1 is a side elevation of a portion of an aircraft equipped with a landing gear, according to our invention, and showing the landing gear in an extended position;

Fig. 2 is a transverse section through a portion of the aircraft, showing the landing gear in an extended position;

Fig. 3 is a section similar to Fig. 2, showing the landing gear in a retracted position;

Fig. 4 is a front elevation, partly in section, of a detail of the landing gear; and Fig. 5 is a side elevation, partly in section of the detail shown in Fig. 4.

A fuselage generally designated as 11 and having a wing 12, is provided with a fuselage framework 13. The fuselage 11 has formed in the lower surface thereof an opening or recess 14 of a substantially circular conformation, and into which a landing gear 15, carrying a wheel 16 is adapted to be withdrawn. The elements 14, 15 and 16 are shown in the drawing on one side of the plane of symmetry of the fuselage 11 and are duplicated in opposite phase, along with the detail structure hereinafter to be described, on the opposite side of said plane of symmetry to provide two points of ground contact.

The framework 13, in the vicinity of the landing gear 15 is provided with a downwardly extending skeleton frame 17, having a pair of alined pivots 18 and 19. Members 20 and 21 are adapted to swing, respectively, about the pivots 18 and 19, and are joined at their outer ends by a member 22. To the frame, formed by the members 20, 21 and 22, a substantially pyramidal structure 23 is attached, the apex 24 of which is provided with a pivot 25.

The fuselage framework 13 is provided with a side frame 26 carrying a bearing 27, and is also provided with a top frame 28 carrying a bearing 29. Between the bearings 27 and 29, a screw 30 is held for rotation. Just above the bearing 29, a pair of bevel gears 31 is provided with an operating shaft 32 extending rearwardly to the crew's quarters. By turning the shaft 32, the screw 30 is thereby caused to rotate. A nut 33 carrying an external pivot 34 is installed on the screw 30, and upon turning of the shaft 32, the nut 33 may be traversed along the screw 30 between the bearings 27 and 29. Between the pivot 34 on the nut 33 and the pivot 25 on the structure 23, a shock absorbing member 35 is held.

Below and between the pivots 18 and 19, a guiding device 36 is mounted on the skeleton framework 17. This guiding device, more clearly shown in Figs. 4 and 5, comprises a pair of downwardly extending members 37 and 38, each having formed therein inwardly opening grooves 39. At the lower end of the member 37, projecting inwardly into the grooves 39, is a stud 40, and a similar stud 41 extends inwardly from the lower end of the member 38 into the groove 39. A strut 42 is adapted to extend from the guiding device 36 and is provided with a forked yoke 43 at its upper end engageable within the grooves 39. The yoke 43 is formed with a substantially V-shaped fork 44. It will now be seen that when the yoke 43 lies at the lower end of the grooves 39, it engages the studs 40 and 41 by virtue of the fork 44. When the strut 42 is in any angular attitude with respect to the guiding device 36, below a substantially horizontal attitude, the forked yoke 43 locks around the studs 40 and 41, preventing upward travel thereof, and hence of the strut 42, in the grooves 39. Should the strut 42 be swung about the studs 40 and 41 above a substantially horizontal attitude, the yoke 43, by virtue of the fork 44 uncovering the studs 40 and 41, may move upwardly along the guiding grooves 39.

The strut 42 extends outwardly from the guiding device 36, substantially parallel to the members 20 and 21. The outer end of the strut 42 is provided with a pivot 45, and the outer ends of the members 20 and 21 are provided with alined pivots 46 and 47. To the three pivots 45, 46 and 47, a wheel frame 48, carrying an axle 49 is attached. On said axle, the wheel 16 is carried for rotation. The frame 48 is also provided with a cam 50 which, when the landing gear is in an extended position, projects in a substantially horizontal direction from the pivot 47. A suitable brace 51 serves to strengthen the cam 50.

Assuming the landing gear in the extended positions, as shown in Figs. 1 and 2, retraction thereof is effected by turning the shaft 32, which causes traversing of the nut 33 along the screw 30 in an upward direction. By this motion, the frame, including the members 20, 21, 22 and 23, is drawn upwardly, through the medium of the shock absorbing strut 35. This motion also lifts the strut 42, with the wheel frame 48 and the wheel 16. When the landing gear has been raised to a position such that the strut 42 is substantially horizontal, the yoke 43 is in condition to disengage the studs 40 and 41, and also, at such time, the cam 50 engages with a cam engaging device 52 carried by the fuselage 11. Up to this point, the wheel has been lifted, but has remained in a substantially vertical plane. Upon retraction of the landing gear beyond this point, engagement of the cam with the device 52 causes the wheel to turn inwardly, and simultaneously, causes the strut 42 to travel upwardly, restrained by the grooves 39 in the guiding device 36. Full retraction of the landing gear 15, in which condition the nut 33 lies adjacent the upper screw bearing 29, results in the wheel 16, with the landing gear 15, lying wholly within the recess 14 in the fuselage.

Extension of the landing gear from a retracted position is effected by turning the shaft 32 in the opposite direction, whereupon reversal of the above described functions takes place, until the nut 33 lies adjacent the lower screw bearing 27.

By the mechanism above described, the wheels may be quickly extended or retracted from or into the recess 14. When in the retracted position, the wheels 16, with the whole of the landing gear 15, lie wholly within the recess 14 to allow for considerable increase in speed of the craft as a whole. It is well known that by retraction of landing gears in airplanes, speed increases in the neighborhood of 5% to 15% may be effected.

Although in our invention there are several struts which are exposed to the air stream, when the landing gear is extended, this is of no moment, since when the gear is extended the craft is in condition for landing or take-off, at which time speed conditions are unimportant.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. In aircraft, a retractable landing gear comprising a pivot on said aircraft, a member having one end thereof adapted to swing about said pivot, a guide on said aircraft, a second member having one end thereof adapted to swing in and move along said guide, a wheel axle pivoted to the opposite ends of said two members, means for moving said two members with said axle from an extended to a retracted position, the end of said second mentioned member associated with said guide being adapted to move along said guide upon the indicated retractive movement of said member, a cam carried by said axle, and a cam engager on said aircraft adapted to engage said cam upon partial retraction thereof for turning said axle to a different position with respect to said aircraft.

2. In aircraft, a retractable landing gear including a strut pivoted to said aircraft, a wheel axle pivoted to said strut, means for moving said strut between an extended and a retracted position, and means carried by said aircraft adapted to engage said axle after partial retraction of said strut to turn said axle out of parallelism with the axis thereof when extended.

3. In aircraft, a body having a recess, a retractable landing gear including a strut, a wheel axle associated therewith, means for moving said strut and said axle from an extended to a retracted position, and means independent of said moving means for engaging said landing gear and for turning said axle into said recess, and out of parallelism with the axle axis when said axle is extended as said landing gear is retracted.

4. In aircraft, a body having a recess, a retractable landing gear including a pair of substantially parallel spaced struts pivoted to said body, a wheel axle pivoted to the opposite ends of said struts, said wheel axle being adapted to move between an extended and a retracted position and to be held in a definite relation to said aircraft at all times by the substantial parallelogram formed by said struts, means for retracting said axle, and means on said body engageable with said axle upon partial retraction of said landing gear for urging said axle into said recess.

5. In aircraft, a landing gear comprising a strut hinged to said aircraft, a wheel axle hinged to the outer end of said strut, means for retracting said strut and axle into, and extending them from, said aircraft, means automatically operative during a portion of the travel of said landing gear between extended and retracted positions to act upon said axle to confine it to a predetermined path of movement, and a second means operative during another portion of said travel to act upon said axle to confine it to a different path of movement.

6. In aircraft, a landing gear comprising a strut hinged to said aircraft, a wheel axle hinged to the outer end of said strut, means for retracting said strut and axle into, and extending them from, said aircraft, means automatically operative during a portion of the travel of said landing gear between extended and retracted positions to act upon said axle to confine it to a predetermined path of movement, a second means operative during another portion of said travel to act upon said axle to confine it to a different path of movement, a member on said aircraft, and means carried by one said confining means engageable with said member to hold said axle in a relatively fixed position when said landing gear is extended.

7. In aircraft, a landing gear comprising a strut hinged to said aircraft, a wheel axle hinged to the outer end of said strut, means for retracting said strut and axle into, and extending them from, said aircraft, means automatically operative during a portion of the travel of said landing gear between extended and retracted positions to act upon said axle to confine it to a predetermined path of movement, and a second means operative during another portion of said travel to act upon said axle to confine it to a different path of movement, both said confining means being adapted to move said axle relative to said strut.

8. In aircraft, a landing gear including an axle movable between extended and retracted positions, means cooperating with said axle and operable only through a portion of the movement thereof for guiding the axle in a predetermined path, and a member carried by said aircraft with which said guiding means is adapted to cooperate to lock said axle and said guiding means in a relatively fixed position when said axle is extended.

9. In aircraft having a body, a retractable landing gear comprising an axle frame, a pair of struts spacedly pivoted at their one ends to said frame and spacedly pivoted at their other ends to said body, and means for releasing one of said strut pivots after partial retraction of said landing gear.

10. In aircraft having a body, a retractable landing gear comprising an axle frame, a pair of struts spacedly pivoted at their one ends to said frame and spacedly pivoted at their other ends to said body, means for releasing one of said strut pivots after partial retraction of said landing gear, and means engageable with said axle frame for initiating tilting of said axle substantially at the same position in the retraction of said landing gear at which said release means releases said strut pivot.

11. In aircraft having a body, a retractable landing gear having an axle and a substantially parallelogram linkage for connecting said frame for movement relative to said body, means operable at a certain position of said frame relative to said body for releasing one of the linkage pivots, and means for thereafter guiding said frame along a path divergent from the path in which said linkage would cause said frame to move.

SAMUEL T. PAYNE.
FREDERICK R. WEYMOUTH.